324-77.
SR
10-10-72 XR 3,697,753

United States Patent
Martone et al.

[15] 3,697,753
[45] Oct. 10, 1972

[54] SCINTILLATION CAMERA HAVING A VARIABLE GAIN PLURAL AMPLIFIER SYSTEM

[72] Inventors: Ronald J. Martone, Cheshire; Peter G. Mueller, Guilford, both of Conn.

[73] Assignee: Picker Corporation, White Plains, N.Y.

[22] Filed: June 18, 1969

[21] Appl. No.: 834,346

[52] U.S. Cl. ........250/71.5 S, 250/71.5 R, 250/83 C, 250/83.3 R, 324/77 A, 330/84, 330/103
[51] Int. Cl. ........G01t 1/20
[58] Field of Search ........250/71.5 S, 71.5 R, 83.3 R, 250/83 C; 324/77 A; 330/84, 85, 86, 96, 97, 98, 103

[56] References Cited

UNITED STATES PATENTS

| | | | |
|---|---|---|---|
| 3,011,057 | 11/1961 | Anger | 250/71.5 S |
| 3,458,821 | 7/1969 | Clarridge | 330/86 UX |
| 3,515,878 | 6/1970 | Ried, Jr. et al. | 250/71.5 X |

*Primary Examiner*—James W. Lawrence
*Assistant Examiner*—Morton J. Frome
*Attorney*—Watts, Hoffmann, Fisher & Heinke

[57] ABSTRACT

A scintillation camera system is disclosed having a scintillator camera which produces electrical signals corresponding to scintillation intensity and location on a scintillator. The system has circuitry for processing these signals including a plurality of signal amplifiers which individually amplify the intensity and location signals. The gain of these signal amplifiers is adjustable by a remote switch which alters the condition of gain control circuitry associated with the signal amplifiers.

The disclosed signal amplifiers further include a control circuit which stabilizes the direct current (D.C.) output of the amplifiers at a particular level with respect to a reference voltage and yet permits output pulses to be produced without altering the output pulse amplitudes.

11 Claims, 2 Drawing Figures

INVENTORS.
RONALD J. MARTONE
PETER G. MUELLER
BY Watts, Hoffmann, Fisher & Heinke
ATTORNEYS.

INVENTORS
RONALD J. MARTONE
PETER G. MUELLER
BY Watts, Hoffmann,
Fisher & Heinke
ATTORNEYS.

SCINTILLATION CAMERA HAVING A VARIABLE GAIN PLURAL AMPLIFIER SYSTEM

CROSS-REFERENCED PATENTS AND PATENT APPLICATIONS

U.S. Pat. application, Ser. No. 739,793, filed June 25, 1968 by Peter G. Mueller, for "Pulse Height Analyzer".

U.S. Pat. application, Ser. No. 739,889, filed June 25, 1968 by Robert Hindel, for "Scintillation Detector Indication System".

U.S. Pat. application, Ser. No. 837,072, filed June 27, 1969

By Martone et al., "Scintillation Camera".

U.S. Pat. No. 3,532,927, issued Oct. 6, 1970 to Hindel et al., for "Radiation Image Apparatus".

BACKGROUND OF THE INVENTION

1. Field of the Invention

The present invention relates to a scintillation camera system and more particularly relates to a scintillation camera system having signal amplifiers connected to a scintillation camera unit of the system.

2. The Prior Art

In the diagnosis of certain illnesses, radioactive isotopes are administered to patients. Many administered isotopes have the characteristic of concentrating in certain types of tissue and either not concentrating in, or concentrating to a lesser degree, in other types of tissue. For example, iodine 131 collects in thyroid glands. A graphic image produced to show the spacial distribution and concentration of this isotope in the thyroid gland provides an image of the thyroid gland itself. This image is useful in diagnosing a patient's physical condition.

Devices used for producing graphic images of the distribution of an isotope in a subject are known as scanners and cameras. Cameras are maintained stationary with respect to the patient as a graphic image of the spacial distribution of an isotope is developed. Many cameras include a relatively large disc-like scintillation crystal positioned to be bombarded by radiation emitted by a patient. The scintillation crystal produces light energy in response to bombardment by high energy electromagnetic radiation, such as gamma rays. This light energy is in the form of flashes or scintillations.

Photo responsive circuitry is generally associated with the scintillator crystal for producing electrical signals in response to scintillations in the crystal. Generally such circuitry includes a plurality of phototubes positioned near the crystal which produce signals proportional to both the intensity of a scintillation and its location in the scintillator.

A given scintillation results in a number of simultaneous output signals from the phototubes. These signals are amplified and processed by electrical circuitry which is in turn connected to a cathode ray tube (CRT) of an oscilloscope. An image of the location and intensity of scintillations detected by the camera is produced by illuminated points on the oscilloscope screen. In addition to oscilloscopes, such signals can be transmitted to magnetic tape recorders or other suitable recording or imaging devices.

One type of preferred circuitry for processing signals from a camera is described in greater detail in the referenced applications; however, briefly, such circuitry includes summing and ratio circuits which determine the location of a given scintillation along the X and Y axes of an arbitrarily chosen coordinate system on the scintillator crystal. These signals are processed and applied to the horizontal and vertical deflection circuits of the oscilloscope. Signals corresponding to the intensity of a given scintillation, termed Z axis signals, are also processed by the circuitry for permitting production of an electron beam in the CRT.

The processing circuitry also includes a pulse height analyzer, which determines whether a detected scintillation has resulted from radiation within a desired energy level range.

If a given scintillation is within a desired intensity level range, the pulse height analyzer circuitry permits the CRT to produce an electron beam which is deflected in accordance with the output signals from X and Y axis summing and ratio circuits which result from that scintillation. An illuminated point or spot on the screen of the CRT is thus produced at a location on the screen which corresponds to the X and Y location of the scintillation in the scintillator crystal.

When the spatial distribution and concentration of a given isotope in an organ or the like is being imaged by a camera of the type referred to, radiation having energy levels inconsistent with the radiation energy level characterizing the isotope under study are often incident on the scintillator. It is undesirable to include such radiation in the image produced by the system. The pulse height analyzer establishes a range of peak scintillation intensities to which the signal processing circuitry will respond. This range is referred to as a "-window". Scintillations having peak intensities above the upper limit or below the lower limit of this window are discarded. Hence, the image produced by the system is an image of radiation having an energy level range produced by the isotope under observation.

It has long been known that radiation emanating from a given radioactive isotope may be of markedly different energy level range from radiation produced by another isotope. Accordingly, scintillation camera systems have been provided which, in effect, shift the pulse height analyzer "window" relative to the peak scintillation intensities detected by the camera. This enables the study of different isotopes producing various radiation energy levels.

Adjusting the radiation energy level range to which a scintillation camera system responds has been found to involve a large number of switching operations. Since switching must generally be manually performed remote from the processing circuitry, wiring for enabling the switching has been thought to involve considerable numbers of conductors extending between the signal processing circuitry and an accessible control panel. Such wiring has involved not only relatively high labor and material costs in the construction of the system but may also present shielding problems as well as complicating design considerations in connection with packaging the system equipment.

Another problem which has arisen in the past has been that of stabilizing the D.C. output of signal amplifiers so that the output is accurately stabilized with respect to a D. C. reference voltage.

The present invention provides a new and improved scintillator camera system of the character referred to in which the peak intensity range of scintillations to which the camera system is responsive is adjustable by altering the gain of signal amplifiers in the system by operation of a remote range switch having a relatively small number of wires, connections and switch contacts.

Another general object of the invention is the provision of a new and improved system in which the D.C. signal amplifier output is accurately stabilized with respect to a reference level.

SUMMARY OF THE INVENTION

A scintillation camera system constructed in accordance with the present invention includes a camera unit providing X, Y and Z axis electrical signals to signal processing circuitry. This circuitry processes the electrical signals so that an image of selected scintillations is displayed on an oscilloscope screen or transmitted to another suitable device such as a magnetic tape recorder.

The X, Y and Z axis signals are amplified by variable gain amplifier units each of which consists of an operational amplifier having a feedback circuit and an output circuit associated with an output stabilizing circuit and gain control circuitry. The output stabilizing circuit is effective to compare the D.C. or no signal, output level of the amplifier to a given reference voltage and to alter feedback to the amplifier so that the D.C. output voltage is stabilized at a predetermined level relative to the reference voltage.

Preferably, the stabilizing circuit includes a difference circuit having a branch effective to alter the feedback to the amplifier through the feedback circuit in response to shifting of the D.C. output voltage relative to the reference voltage in one direction. The changing feedback level returns the output voltage to a predetermined stabilized level relative to the reference voltage. The difference circuit is ineffective to alter the feedback when the amplifier output shifts in the opposite direction relative to the reference voltage, i.e. when a photo responsive signal is amplified.

In order to enable the scintillation camera system to detect and image various radiation levels, the range of scintillation intensities to which the system responds is variable. The gain control circuitry enables this shift in range. This control circuitry is provided by a network or series of feedback loops for each signal amplifier which are individually connectable across the output and input of the amplifier to cooperate with the feedback circuit in changing the gain of the amplifier when any one of the loops is conductive.

In a preferred system, the camera produces two X axis signals, two Y axis signals, and a Z axis signal. Each of these signals is amplified by a separate signal amplifier. The Z axis signal amplifier output is connected to the pulse height analyzer input and thus when the gain of the Z axis amplifier is adjusted, the peak output of that amplifier, in response to a given scintillation detected by the camera, shifts relative to the window.

The amplified Z axis signal levels must remain relatively the same as the amplified signal levels from the X and Y axis signal amplifiers in order to assure accurate imaging. Accordingly, all of these amplifiers must be gain adjusted simultaneously. The present invention provides a remote switch for simultaneously adjusting the gain of each of the signal amplifiers with minimal wiring and switching functions and with switching being performed remote from the amplifiers.

Specifically, each of the feedback loops for each amplifier includes a semiconductor switch having its control electrode connected in a circuit completed through contacts of a remote switch. Corresponding semiconductors in each of the other amplifiers have control electrodes connected to the same switch contacts so that when the switch contacts are operated, each of the corresponding semiconductors is operated to a conductive state for enabling gain adjustment of each amplifier.

Other objects and advantages of the invention will become apparent from the following detailed description thereof made with reference to the accompanying drawings to form a part of the specification.

DESCRIPTION OF A PREFERRED EMBODIMENT

Figure 1:
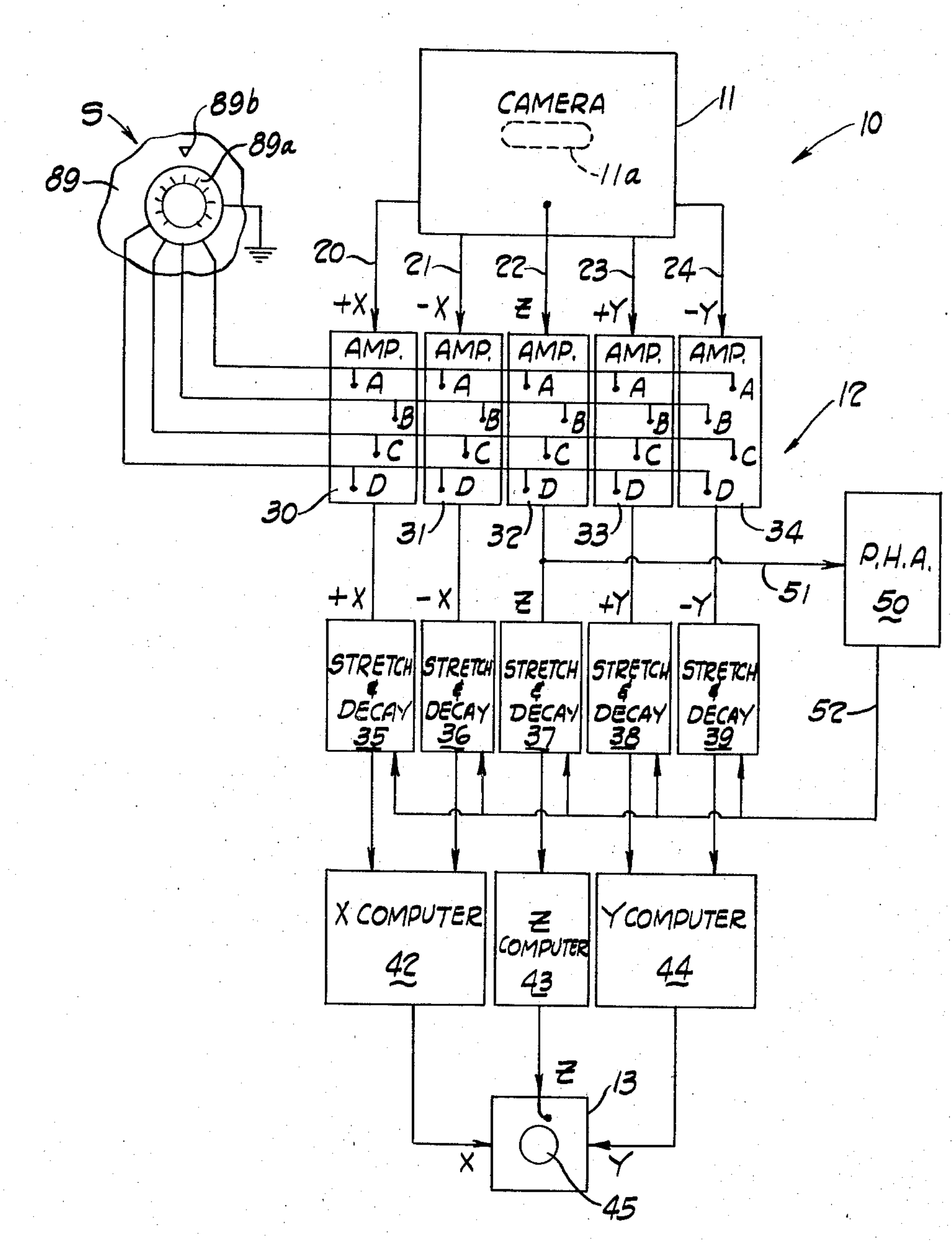
FIG. 1 is a diagramatical illustration of a portion of a scintillation camera system embodying the present invention; and, FIG. 2 is a schematic diagram of variable gain signal amplifiers utilized in the system of FIG. 1.

FIG. 1 shows a scintillation camera system 10 including: A camera unit 11 for producing electrical signals related to the location and intensity of scintillations detected by the camera; signal processing circuitry 12; and an oscilloscope 13 which is connected to the signal processing circuitry 12 so that an image of selected scintillations detected by the camera 11 may be displayed.

The camera 11 includes a scintillator crystal **11*a* (broken lines) which produces flashes of light, or scintillations, in response to the bombardment of the crystal by electromagnetic radiation, and photo responsive circuitry for producing the electrical signals in response to scintillations occurring in the crystal. This circuitry includes a plurality of phototubes (not shown) positioned adjacent the scintillator 11*a***.

Outputs 20–24 from the camera unit carry these signals to the circuitry 12. The outputs 20, 21 carry plus and minus X axis output signals from the camera; the outputs 23, 24, carry plus and minus Y axis output signals; and the output 22 carries the Z axis, or intensity signals.

The circuitry 12 includes variable gain signal amplifier units 30–34 connected to the outputs 20–24, respectively. These amplifier units individually amplify the signals from the camera 11. The amplifier units 30–34 have a common gain so that the relative strengths of the amplified output signals are the same as the relative strengths of the signals in the outputs 20–24. The outputs of the variable gain amplifier units are each connected to an associated one of pulse stretching and decay circuits 35–39. A stretch and decay circuit which might be employed is described in detail in the above referenced patent application, Ser. No. 739,889.

The outputs of the stretch and decay circuits are fed to suitable computers 42, 43, 44 which algebraically combine the plus and minus X signals and the plus and minus Y signals and amplify these combined signals and Z signal for use in imaging.

The oscilloscope 13 includes a cathode ray tube (CRT) 45 having X, Y and Z inputs connected to corresponding ones of the computers. The CRT is thus operated from the circuitry 12 to display an image on the screen of the tube.

In order for the system 10 to image only the concentration and spatial distribution of radiation from a given isotope it is necessary to discriminate between radiation of an energy level range likely to be emitted by the isotope under consideration and other radiation which may be incident on the scintillator but having energy levels inconsistent with those of the isotope. For this reason, the circuitry 12 includes a pulse height analyzer 50 which receives amplified photo responsive signals from the Z axis amplifier unit 32 by way of an input 51. The pulse height analyzer 50, in effect provides a "window" having an upper limit and a lower limit.

Scintillations which produce a peak amplified intensity occurring between the upper limit and the lower limit of the "window" are processed by the circuitry 12 and form part of an image on the CRT 45. Amplified intensity peaks which are higher than the upper limit or lower than the lower limit are disregarded by the circuitry 12. The pulse height analyzer includes an output 52 which is effective to disable the stretch and decay circuits 35–39 when such signals are received by the pulse height analyzer. By the provision of a "window" of the type described, the system 10 is effective to enable imaging of a particular radiation level energy range likely to be emitted by the isotope under study.

Various isotopes emit radiation at differing energy levels. Thus an isotope emitting relatively low energy radiation will normally produce scintillations which are of lesser intensity than scintillations produced by an isotope emitting higher energy level radiation. To enable the systems 10 to be used for studying various isotopes, the amplifiers 30–34 are variable gain amplifiers. The gain of these amplifiers is adjustable so that the amplified photo-responsive signals transmitted to the pulse height analyzer from the Z axis signal amplifier can be adjusted in amplitude.

The relative strengths of the amplified signals from these amplifiers must remain the same as the relative strengths of their input signals for accurate imaging. According to the invention, gain control circuitry 55 (FIG. 2) enables simultaneous adjustment of the gains of these amplifiers. Hence wide ranges of photo-responsive output signals from the camera 11 can be amplified to produce peak levels coming within the "-window" provided by the pulse height analyzer while accurate imaging is maintained.

Those familiar with this art will recognize that adjusting the gain of the Z axis amplifier to enable selected signal pulses to pass through the "window" means little if the D.C. output level of the signal amplifier, i.e. the "no signal" voltage level of the amplifier output, is not accurately stabilized with respect to a reference voltage. The amplified signals are superimposed on the D.C. output voltage of the amplifier and hence if the D.C. output voltage is permitted to shift or "float" relative to a given reference, the amplified signals shift accordingly. This can result in radiation having energy levels in a desired range failing to pass through the "-window". Additionally, as noted the output signals from the amplifiers must be of the same relative strength as the corresponding photo responsive signals from the camera if imaging is to be accurate. Hence all of the amplifiers must have D.C. output voltage levels which are stabilized with respect to the reference voltage.

The present invention therefore provides an output stabilizing circuit 56 (FIG. 2) associated with the signal amplifiers for stabilizing their D.C. output voltage levels with respect to a common reference voltage.

Figure 2:
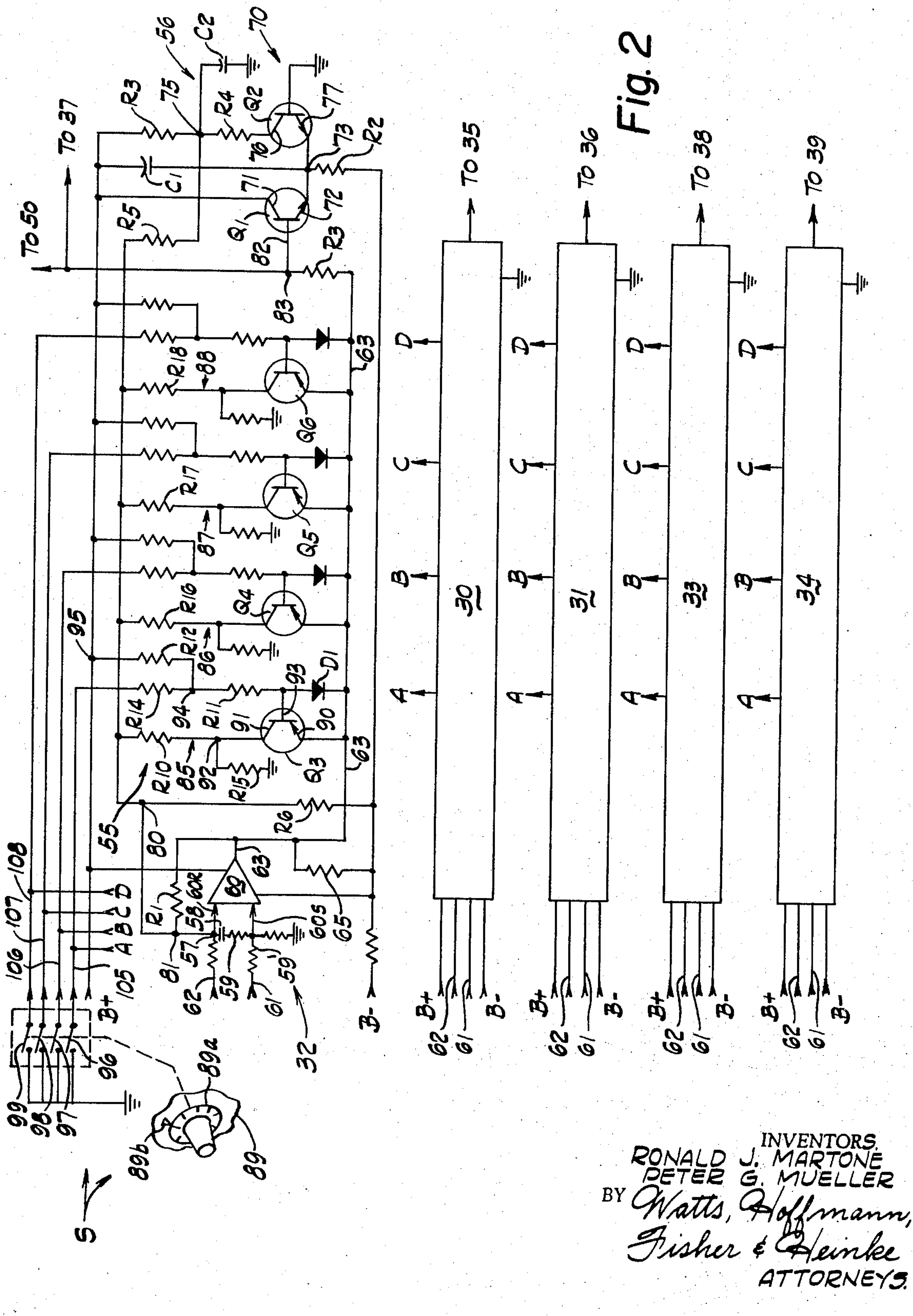

Referring now to FIG. 2, the variable gain signal amplifier section of the circuitry 12 is illustrated in greater detail. All of the amplifiers 30–34 are identical, except as is noted, and accordingly only the Z axis amplifier 32 is illustrated and described in detail. Similar elements of the other amplifiers are designated by corresponding reference characters where appropriate.

The amplifier 32 includes an operational amplifier 60 connected across a D.C. power supply having a 12 volt positive terminal, B+ and a 6 volt negative terminal, B–. The amplifier 60 additionally includes a signal input line 61, a system reference input line 62 (which may be system ground) and an amplifier output line 63. One input 60*r* of the amplifier 60 is connected to the reference line 62 through a resistor 57 and to a second input 60*s* through a capacitor 58 and resistor 59 connected in series. The second input 60*s* of the amplifier 60 is connected to the signal input line 61 through a resistor 57' and to ground through a resistor 59'. An amplifier output line 63 is connected to the input of the pulse height analyzer 50 and to the input of the Z axis stretch and decay circuitry 37 through a resistor R3. The Z axis amplifier is the only one of the amplifiers 30–34 which is connected to the input of the pulse height analyzer.

Negative feedback is provided from the amplifier output line 63 to the reference input through a feedback resistor R1. The output line 63 is connected to the B– terminal via a suitable resistor 65.

The stabilizing means 56 accurately stabilizes the D.C. output of the amplifier 60 at a predetermined level with respect to a reference voltage and includes a difference circuit 70. The difference circuit 70 stabilizes the output of the amplifier 60 so that the D.C. output voltage is not reduced in a negative sense below a predetermined level with respect to ground. On the other hand, the circuit 70 has no effect upon voltage rises in the output line 63 in a positive sense above the predetermined level, as occurs when a photo-responsive signal is transmitted to the input 60*s* of the amplifier.

The circuit 70 is effective to stabilize the D.C. output voltage of the amplifier by altering the feedback to the amplifier. The difference circuit includes NPN transistors Q1, Q2 which are connected to form a differential amplifier. This differential amplifier compares the output D.C. voltage level of the amplifier 60 to a reference voltage, i.e., ground.

The transistor Q1 is connected across the B+ and B– terminals through a circuit including its collector 71 connected to the B+ terminal, and its emitter 72, connected to the B– terminal through a junction 73 and a resistor R2. The collector 76 of the transistor Q2 is connected to the B+ terminal through a resistor R3, a junction 75, and a resistor R4. The emitter 77 of the transistor Q2 is connected to the B− terminal through the junction 73 and the resistor R2.

The conductive condition of the transistor Q2 affects the feedback to the amplifier 60. The junction 75 is connected to the B− terminal through a resistor R5, a junction 80 and a resistor R6. The junction 80 is connected to the amplifier reference input 60*r*.

Conduction from the junction 75 through the resistors R5, R6 establishes a voltage level at the junction 81 in the feedback circuit which varies according to the conductive condition of the transistor Q2 to control the amount of negative feedback. When the transistor Q2 is nonconductive, a predetermined voltage level is established at the junction 81. This predetermined voltage level establishes a particular feedback condition in the feedback circuit.

When the transistor Q2 conducts, the voltage level at the junction 81 is reduced according to the conduction of the transistor Q2, thus reducing the negative feedback and increasing the amplifier output.

Conduction of the transistor Q2 is controlled by the transistor Q1. The base 82 of the transistor Q1 is connected to the output line 63 of the amplifier 60 through the resistor R3 at a junction 83. The transistor Q1 thus conducts in accordance with the difference in the voltage level between its base 82 and its emitter 72.

Conduction of the transistor Q1 maintains the voltage level at the junction 73 sufficiently positive to prevent conduction of the transistor Q2. When the amplifier output voltage level is reduced in a negative sense to a predetermined level with respect to ground, the transistor Q1 turns off and the voltage level at the junction 73 becomes sufficiently negative with respect to the voltage level at the base 84 of the transistor Q2 to turn on the transistor Q2.

The base 84 of the transistor Q2 is grounded and hence the transistor Q2 is turned on whenever the output voltage level at the base 82 of the transistor Q1 decreases to a predetermined level with respect to ground.

When the transistor Q2 turns on, conduction through its collector and emitter reduces the voltage level at the junction 75 and hence reduces the voltage level at the junctions 80–81 associated with the feedback circuit. This reduction in voltage level at the junction 80 reduces the amount of negative feedback through the circuit 64 and accordingly increases the D.C. output voltage of the amplifier 60 in a positive sense. The D.C. output voltage increases to a level at which the transistor Q1 is again turned on, thus turning off the transistor Q2.

The difference circuit has no effect on output voltage rises in a positive sense above the predetermined level since the transistor Q2 remains nonconductive when such rises occur. Hence, when a photo-responsive signal is amplified, the circuit 70 is ineffective to alter the amplitude of the amplified signal.

The capacitor C1 in the difference circuit 70 is a filter capacitor, while the capacitor C2 couples the junction 75 to ground.

In the illustrated embodiment of the invention, the gain control means 55 enables each of the photo-responsive signal amplifiers to be adjusted for providing five different gains. The gain adjustments are made manually and remote from the amplifier units and require a minimal number of electrical conductors and switch contacts.

Gain adjustment is manually controlled by a range switch S preferably located on a switchable control panel 89. The switch operating knob and the panel 89 are provided with indicia 89a, 89b indicating the range position of the switch. In one operative system of this type, the switch S enables the system to respond to radiation in the following ranges: 44–62 KeV; 62–97 KeV; 97–168 KeV; 168–320 KeV; and 320–662 KeV. In the illustrated embodiment the selector switch knob is rotatable and carries a number of contacts which are operated as the switch knob is rotated. Operation of the switch contacts will be described in greater detail presently.

The gain control circuitry 55 comprises a network of four feedback loops 85–88 which are each connected between the output line 63 of the amplifier 60 and the reference input 60*r* of the amplifier. These loops are in parallel with the feedback resistor R1 so that when any one of the loops conducts, the effective resistance of the feedback path is reduced and the amplifier gain is reduced by the increased negative feedback.

The feedback loops 85–88 are schematically the same and each includes an electronic switch and an impedance element. The loops are of the same general configuration and function alike except for the impedance afforded by each loop. Accordingly, only one of these loops is described in detail.

The feedback loop 85 includes an electronic switch in the form of a PNP transistor Q3 having its emitter 90 connected to the output line 63 and its collector 91 connected to the reference input 60*r* through a junction 92, a resistor R10 and the junctions 80, 81. The junction 92 is grounded through a resistor R15. The transistor Q3 is normally turned off since its base 93 is connected to the B+ terminal through a resistor R11, a junction 94, a resistor R12 and a junction 95 and to ground through a diode D1. The voltage drop across the diode D1 maintains the base 93 positive with respect to the emitter 90 and the transistor Q3 nonconductive.

When the loops 85–88 are nonconducting, the feedback resistor R1 controls the gain of the amplifier. The range switch S is operated to enable conduction of individual ones of the loops 85–88 to thus increase the negative feedback to the amplifier and reduce its gain to a predetermined level.

Referring again to the feedback loop 85, the transistor Q3 is turned on by closing normally open switch contacts 96 of the range switch S. The contacts 96 close to connect the junction 94 to ground through a resistor R14 and the switch contacts 96. With the contacts 96 closed, the potential on the base 93 goes negative relative to the potential on the emitter 90. This permits forward conduction through the emitter-base junction of the transistor Q3 and saturation of that transistor.

Since the transistor Q3 saturates, the impedance of the loop 85 is controlled by the resistor R10. The resistor R10 is effectively connected in parallel with the feedback resistor R1 so that the net feedback impedance in the amplifier is reduced and the gain of the amplifier drops to a predetermined level.

During conduction of the transistor Q3, the diode D1 blocks conduction from the output of the amplifier to ground through the switch contacts 96.

It should be noted that the output stabilizing means 56 is effective to maintain the D.C. output level of the amplifier at the predetermined level with respect to ground even when the feedback loop 85 conducts. Hence although the gain of the amplifier unit is reduced when the loop 85 conducts, the D.C. output voltage level does not shift accordingly.

The feedback loops 86–88 include PNP transistors Q4–Q6, respectively, which have their emitter and collector electrodes connected for establishing circuits parallel to the feedback resistor R1. Resistors R16–R18 are connected in series with the emitter-collector circuits of the transistors Q4–Q6, respectively. These resistors determine the impedance of their respective feedback loops. The transistors Q4–Q6 are individually turned on and saturated, as described with reference to the transistor Q3, so that the associated resistor controls the amplifier gain. In one system which has been operated successfully, the gain of the amplifier units has been adjustable stepwise to gains of 9.1; 6.3; 3.2; 2 and 1. In each case, the stabilizing means 56 assures that the D.C. output level from the amplifier unit is maintained at the stabilized level.

The bases of the transistors Q4–Q6 are connected to ground through switch contacts 97–99, respectively, of the switch S. The switch contacts 96–99 are independently operated so that when any one set of contacts is closed, the others are open. The switch knob is also operable to a position in which all of the switches 96–99 are opened (FIG. 2). Hence, either all of the feedback loops are nonconducting, or only a selected one of the loops conducts, depending on the position of the switch knob. Further gain adjustments of the amplifier unit could be obtained by simultaneous closing of more than one of the contacts 96–99; however, that construction is not illustrated.

The loops 85–88 in the amplifier units 30, 31 and 33, 34 are identical to the loops 85–88, respectively, of the amplifier unit 32. Thus, for example, when the loop 85 in each amplifier unit conducts, the adjusted gain of each amplifier unit is the same as that of each of the other amplifier units. Maintaining the gains of all the amplifier units consistent is necessary for proper summing of the position signals.

The base electrodes of the transistors Q3 in each loop 85 are connected together through their respective resistors R11, R14 at a junction A adjacent the amplifier units. The junction A is connectable to ground through a single conductor 105 and the switch contacts 96 which are remote from these amplifier units. The base electrodes of the transistors Q4–Q6 of each amplifier unit are similarly connected at junctions B, C and D, respectively. The junctions B-D are adjacent the amplifier units and these junctions are connectable to ground through the switch contacts 97-99 respectively, via the conductors 106–108. Thus five amplifiers can be gain adjusted simultaneously by operation of four remote switch contacts to provide five different gains for each amplifier unit, and yet only four conductors extend between the circuitry 12 and the four contact sets in the remote gain adjustment switch.

It can now be seen that a new and improved scintillation camera system has been provided and that the objects heretofore enumerated and others have been accomplished. While a preferred embodiment of the invention has been illustrated and described in detail, the invention is not to be considered limited to the precise construction shown.

What is claimed is:

1. In a scintillation camera system having a scintillator camera for producing electrical signals corresponding to the intensity and coordinate locations of a scintillation in a scintillator, circuitry for processing said signals comprising:

a. a plurality of signal amplifiers for individually amplifying said signals;

b. gain adjusting means for selectively changing the gain of all of said amplifiers simultaneously;

c. said gain adjusting means including at least a first feedback loop for each amplifier, said feedback loop including an electronic switch having a state of conduction in which said feedback loop changes the gain of said amplifier;

d. control electrode means for each electronic switch in each amplifier, said control electrode means being connected in parallel with each other;

e. a remote switch having contacts connected to a series circuit with said electrodes and operated to establish a circuit for simultaneously conditioning said electronic switches to said state of conduction whereby the gains to said amplifiers are simultaneously changed by substantially equal amounts;

f. each amplifier including output stabilizing means effective to prevent the D.C. output level of the amplifier from changing in one sense direction from a predetermined level relative to a reference signal; and, g. said output stabilizing means preventing said D.C. output voltage of each of said amplifiers from shifting in said one sense from said level when the gains of said amplifiers are changed.

2. A system as claimed in claim 1 wherein each amplifier includes a plurality of said feedback loops, each loop having a different impedance from the other loops and corresponding loops in different amplifiers having the same impedance when in said state of condition, said remote switch including a plurality of switch contacts at least as many in number as the number of said feedback loops in each amplifier, and the electronic switch in each loop being rendered effective only by operation of switch contacts connected to the control electrode means thereof.

3. A system as claimed in claim 1 wherein said first feedback loops associated with said amplifiers have uniform impedances whereby the gains of said amplifiers are uniformly changed by substantially equal amounts when said contacts are operated.

4. A system as claimed in claim 1 wherein said gain adjusting means further includes at least second feedback loops for each amplifier, the second feedback loop in each amplifier including an electronic switch having a control electrode, said control electrodes of said second feedback loops being electrically connected in parallel with each other, and each of said control electrodes being electrically connected in a series circuit with a second set of contacts of said remote switch.

5. A system as claimed in claim 4 wherein said first feedback loops have substantially equal impedances and said second feedback loops have a common impedance different from the impedance of said first feedback loops, said first feedback loops effective to change the gain of said amplifiers from a first gain to a second gain when said first set of switch contacts operates and said second feedback loops are effective to change the gain of said amplifier to a third gain when said second set of switch contacts operates.

6. In a scintillation camera system having a camera unit for producing separate photo-responsive signals relating to position and intensities of scintillations detected by said camera, and circuitry for processing said signals on a discriminating basis, said signal processing circuitry including:

a. a plurality of amplifiers for individually amplifying said separate photo-responsive signals;

b. each amplifier including output stabilizing means effective to prevent the D.C. output level of the amplifier from changing in one sense direction from a predetermined level relative to a reference signal;

c. gain control means associated with each amplifier for changing the gain of said amplifier and tending to shift said D.C. output level in said one sense direction relative to said reference signal;

d. switch means for operating said gain control means to change the gains of said amplifiers simultaneously; and, e. said output stabilizing means preventing said D.C. output voltage of each of said amplifiers from shifting in said one sense from said level when the gains of said amplifiers are changed.

7. A system as claimed in claim 6 wherein said stabilizing means includes a difference circuit including a branch having a first conductive condition when said D.C. output level shifts from said predetermined level in said one sense and effective in said first conductive condition to alter feedback to the amplifier for returning said D.C. output level to said predetermined level.

8. A system as claimed in claim 7 wherein said branch is in a second conductive condition when said D.C. output voltage is at said level, and said branch is ineffective to alter feedback to said amplifier when said voltage shifts in an opposite sense from said predetermined level relative to said reference level.

9. In a scintillation camera system having a scintillation camera for producing electrical output signals in response to intensity and coordinate locations of a scintillation in a scintillator, signal processing circuitry comprising:

a. a signal amplifier for amplifying a signal from said camera;

b. output stabilizing circuitry for preventing the D.C. output level of said amplifier from shifting in one sense direction from a predetermined level with respect to a reference level; and, c. said stabilizing circuit including a difference circuit for comparing the D.C. output level of said amplifier with said reference and for altering feedback to said amplifier in response to shifting of said output level in said sense direction from said predetermined level.

10. A system as claimed in claim 9 wherein said difference circuit is ineffective to alter feedback to said amplifier when said output changes in the opposite sense direction from said predetermined level.

11. A system as claimed in claim 9 wherein said signal processing circuitry includes a plurality of signal amplifiers for individually amplifying signals from said camera, each of said amplifiers including said output stabilizing circuitry effective to maintain said D.C. output levels at said predetermined level with respect to said reference level, said reference level being common to all of said amplifiers.

* * * * *